(12) United States Patent
Mozell et al.

(10) Patent No.: US 9,749,701 B2
(45) Date of Patent: Aug. 29, 2017

(54) INTELLIGENT ROUTING OF NOTIFICATIONS TO GROUPED DEVICES

(71) Applicant: Microsoft Corporation, Redmond, WA (US)

(72) Inventors: William Michael Mozell, North Vancouver (CA); David Seymour, Vancouver (CA); Henry Stuart Denison Watson, Vancouver (CA); Sang Young Park, Burnaby (CA); Matthew Nigel Carter, Coquitlam (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/255,048

(22) Filed: Apr. 17, 2014

(65) Prior Publication Data

US 2015/0304733 A1  Oct. 22, 2015

(51) Int. Cl.
| | | |
|---|---|---|
| *H04N 5/445* | (2011.01) | |
| *H04N 21/63* | (2011.01) | |
| *H04N 21/4788* | (2011.01) | |
| *H04N 21/431* | (2011.01) | |
| *H04N 21/443* | (2011.01) | |
| *H04N 21/462* | (2011.01) | |
| *H04N 21/4782* | (2011.01) | |
| *H04N 21/643* | (2011.01) | |

(Continued)

(52) U.S. Cl.
CPC ..... *H04N 21/632* (2013.01); *H04N 21/25891* (2013.01); *H04N 21/41407* (2013.01); *H04N 21/4316* (2013.01); *H04N 21/441* (2013.01); *H04N 21/4438* (2013.01); *H04N 21/4622* (2013.01); *H04N 21/4782* (2013.01); *H04N 21/4788* (2013.01); *H04N 21/64322* (2013.01)

(58) Field of Classification Search
CPC ............. H04N 5/44543; H04N 21/482; H04N 21/4316; H04N 5/44; H04N 21/4622; H04N 21/4781
USPC ........................ 725/37–61, 131–142, 78–80; 709/217–232
See application file for complete search history.

(56) References Cited

U.S. PATENT DOCUMENTS 8,132,220 B2  3/2012 Merlin
8,312,055 B2  11/2012 Arreola
(Continued)

FOREIGN PATENT DOCUMENTS

| WO | 03026275 A2 | 3/2003 |
|---|---|---|
| WO | 03084219 A1 | 10/2003 |
| WO | 0007372 A1 | 2/2010 |

OTHER PUBLICATIONS

Office Action dated Jan. 15, 2016 in U.S. Appl. No. 14/254,673, 19 pages.

(Continued)

*Primary Examiner* — Annan Shang
(74) *Attorney, Agent, or Firm* — Vierra Magen Marcus LLP

(57) ABSTRACT

A system and method are disclosed for enhancing a linear broadcast of a network television program by automatically displaying alerts over the linear broadcast relating to web content determined to be of interest to the linear broadcast or user. The alert may include a link such that, once actioned upon, web content may be presented to the user in addition to the linear broadcast or in the place of the linear broadcast.

20 Claims, 8 Drawing Sheets

(51) Int. Cl.
*H04N 21/258* (2011.01)
*H04N 21/414* (2011.01)
*H04N 21/441* (2011.01)

(56) References Cited

U.S. PATENT DOCUMENTS

| | | | | |
|---|---|---|---|---|
| 8,407,732 | B2* | 3/2013 | Kawai | H04H 60/33 725/27 |
| 8,724,971 | B2* | 5/2014 | Thompson | H04N 5/782 386/248 |
| 8,732,605 | B1* | 5/2014 | Falaki | G06Q 30/02 715/780 |
| 9,032,440 | B2* | 5/2015 | Montvay | H04N 7/163 725/46 |
| 9,043,845 | B2* | 5/2015 | Davis | H04N 21/458 725/62 |
| 2001/0003212 | A1 | 6/2001 | Marler et al. | |
| 2003/0080717 | A1* | 5/2003 | Kajimoto | H03K 19/0175 323/273 |
| 2005/0262542 | A1* | 11/2005 | DeWeese et al. | 725/106 |
| 2006/0258399 | A1* | 11/2006 | Liebowitz | H04M 1/72552 455/556.1 |
| 2007/0288970 | A1* | 12/2007 | Tedenvall | H04L 29/06027 725/86 |
| 2008/0021783 | A1* | 1/2008 | Varghese | G06Q 20/10 705/14.7 |
| 2008/0092199 | A1 | 4/2008 | McCarthy et al. | |
| 2008/0229351 | A1* | 9/2008 | Torimaru | H04N 21/4668 725/14 |
| 2009/0089838 | A1* | 4/2009 | Pino, Jr. | G06Q 30/02 725/40 |
| 2009/0235313 | A1* | 9/2009 | Maruyama | H04N 21/42201 725/46 |
| 2010/0037277 | A1* | 2/2010 | Flynn-Ripley | H04L 29/12896 725/110 |
| 2010/0064321 | A1 | 3/2010 | Lee et al. | |
| 2011/0154200 | A1 | 6/2011 | Davis et al. | |
| 2012/0017236 | A1 | 1/2012 | Stafford et al. | |
| 2012/0124604 | A1* | 5/2012 | Small | H04N 21/4223 725/12 |
| 2012/0210379 | A1 | 8/2012 | McCoy et al. | |
| 2012/0324507 | A1 | 12/2012 | Weber | |
| 2013/0007057 | A1 | 1/2013 | Li et al. | |
| 2013/0031582 | A1 | 1/2013 | Tinsman et al. | |
| 2013/0036200 | A1 | 2/2013 | Roberts et al. | |
| 2013/0152139 | A1 | 6/2013 | Davis et al. | |
| 2013/0291037 | A1* | 10/2013 | Im | H04N 21/4788 725/109 |
| 2013/0312041 | A1* | 11/2013 | Gresta | H04N 21/2365 725/61 |
| 2014/0013359 | A1 | 1/2014 | Pan | |
| 2014/0325541 | A1* | 10/2014 | Hannes | H04N 21/632 725/14 |

OTHER PUBLICATIONS

Response to Office Action filed Apr. 15, 2016 in U.S. Appl. No. 14/254,673, 10 pages.
Response to Office Action filed Oct. 26, 2015 in U.S. Appl. No. 14/254,673.
Final Office Action dated Jun. 17, 2016 in U.S. Appl. No. 14/254,673, 26 pages.
International Search Report & Written Opinion dated Aug. 19, 2014 in International Patent Application No. PCT/US2014/035378, 11 Pages.
Demand for International Examination and Claim Amendments filed Dec. 17, 2014 in International Patent Application No. PCT/US2014/035378, 18 Pages.
Written Opinion of the International Preliminary Examining Authority dated Jan. 27, 2015 in International Patent Application No. PCT/US2014/035378, 8 Pages.
Response to Written Opinion filed Mar. 19, 2015 in International Patent Application No. PCT/US2014/035378.
Office Action dated Feb. 25, 2015 in U.S. Appl. No. 14/254,673.
International Preliminary Report on Patentability date Apr. 29, 2015 in International Patent Application No. PCT/US2014/035378.
Response to Office Action filed May 20, 2015 in U.S. Appl. No. 14/254,673.
Office Action dated Jun. 26, 2015 in U.S. Appl. No. 14/254,673.
Response to Final Office Action filed Sep. 19, 2016 in U.S. Appl. No. 14/254,673, 10 pages.
Office Action dated Oct. 18, 2016 in U.S. Appl. No. 14/254,673, 21 pages.
Response to Office Action dated Mar. 20, 2017 in U.S. Appl. No. 14/254,673, 13 pages.
Final Office Action dated May 22, 2017 in U.S. Appl. No. 14/254,673, 33 pages.

* cited by examiner

*(Step 230)*

*(Step 232)*

INTELLIGENT ROUTING OF NOTIFICATIONS TO GROUPED DEVICES

BACKGROUND

People often gather together to share the experience of watching a television program such as a sporting event or other video content. With the proliferation of hand-held computing devices such as laptops, tablets and smartphones, this group entertainment experience has become more immersive, with users accessing and sharing additional information on the video content via their hand-held devices. In some examples, the video content may itself be web content presented by a gaming console, media center or other primary computing device. In such examples, the primary and hand-held computing devices may be networked together and interact with each other to further enhance the group entertainment experience. It would be advantageous in such a group entertainment environment to be able to intelligently and selectively send electronic notifications to some members of the group, or the group as a whole, via the primary and/or hand-held computing devices.

SUMMARY

A system is provided for enhancing a group entertainment experience by generating and selectively sending electronic notifications to members of the assembled group. The group may be gathered together to watch video content such as a sporting event presented by a primary computing device on a main screen. The group experience may be further enhanced by members of the group having secondary computing devices for receiving supplemental content relating to the main screen video content or otherwise.

During the group entertainment experience, electronic notifications may be generated and sent to members of the group, based on relevance of the notification to individual group members. Where an electronic notification is determined to be of relevance to a group majority or group as a whole, the present system displays the notification on the main screen for all to see. On the other hand, where an electronic notification is determined to be of relevance to a select minority of members of the group, the present system displays the notification to those select members via their secondary computing devices.

In one example, the present technology relates to a method for routing electronic notifications in a group environment having a main display viewed by the group and a plurality of secondary displays viewed by respective members of the group, comprising: (a) generating an electronic notification for at least one member of the group, based on the electronic notification being related to at least one of stored preferences for the at least one member of the group and contextual conditions relating to the at least on member of the group; (b) transmitting the electronic notification for display on the main display where it is determined that the electronic notification relates to at least a predefined number or percentage of members of the group; and (c) transmitting the electronic notification for display on one or more of the secondary displays where it is determined that the electronic notification relates to less than the predefined number or percentage of members of the group.

In another example, the present technology relates to a system for routing electronic notifications to a group environment, comprising: a main display; a primary computing device associated with the main display, the primary computing device receiving content for presentation on the main display; and a plurality of secondary computing devices including secondary displays; wherein the primary computing device receives an electronic notification, the primary computing device causing: i) the electronic notification to display on the main display over the content, or ii) the primary computing device transmitting the electronic notification to one or more of the secondary computing device for display on one or more of the secondary displays, based on whether or not the electronic notification is relevant to at least a predefined number or percentage of members in the group.

In a further example, the present technology relates to a computer-readable media for programming a processor to perform a method of routing electronic notifications in a group environment having a main display viewed by the group and a plurality of secondary displays viewed by respective members of the group, comprising: (a) identifying content that is determined to be of interest to one or members in the group; (b) generating an electronic notification for at least one member of the group upon said step (a) of identifying content that is determined to be of interest to the one or members in the group; (c) determining whether the electronic notification relates to a predefined threshold number or percentage of members of the group; (d) transmitting the electronic notification for display on the main display where it is determined in said step (c) that the electronic notification relates to at least the predefined threshold number or percentage of members of the group; and (e) transmitting the electronic notification for display on one or more of the secondary displays where it is determined in said step (c) that the electronic notification relates to less than the predefined threshold number or percentage of members of the group, the one or more of the secondary displays receiving the transmission in said step (e) being the one or more secondary displays of members for whom the electronic notification was deemed related.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

A system is disclosed for enhancing a group entertainment experience by intelligently and selectively sending electronic notifications to members of the group. The system includes a primary computing device having an associated monitor with the main display. The system further includes group member computing devices, referred to herein as secondary computing devices. After members are admitted to the group and while viewing content on the main display, electronic notifications may periodically be generated and displayed based on a determined relevance to one or more group members. Where the electronic notification is determined to be relevant to some predefined group majority or the group as a whole, the notification may be displayed on the main display. Where the electronic notification is determined to be relevant to specific group members less than the predefined majority, the notification may be displayed on the secondary computing devices of the specific members. Displays for the secondary computing devices may be referred to herein as secondary displays.

Embodiments of the technology described below are presented in the context of sports-related entertainment, enhanced with electronic notifications relating to additional sports-related web content. However, it is understood that the present technology may be used to present a television experience and/or notifications that are unrelated to sports. Such television experiences and notifications may relate in whole or in part to news and current events, entertainment, shopping, music videos, and other subject matter.

Figure 1:
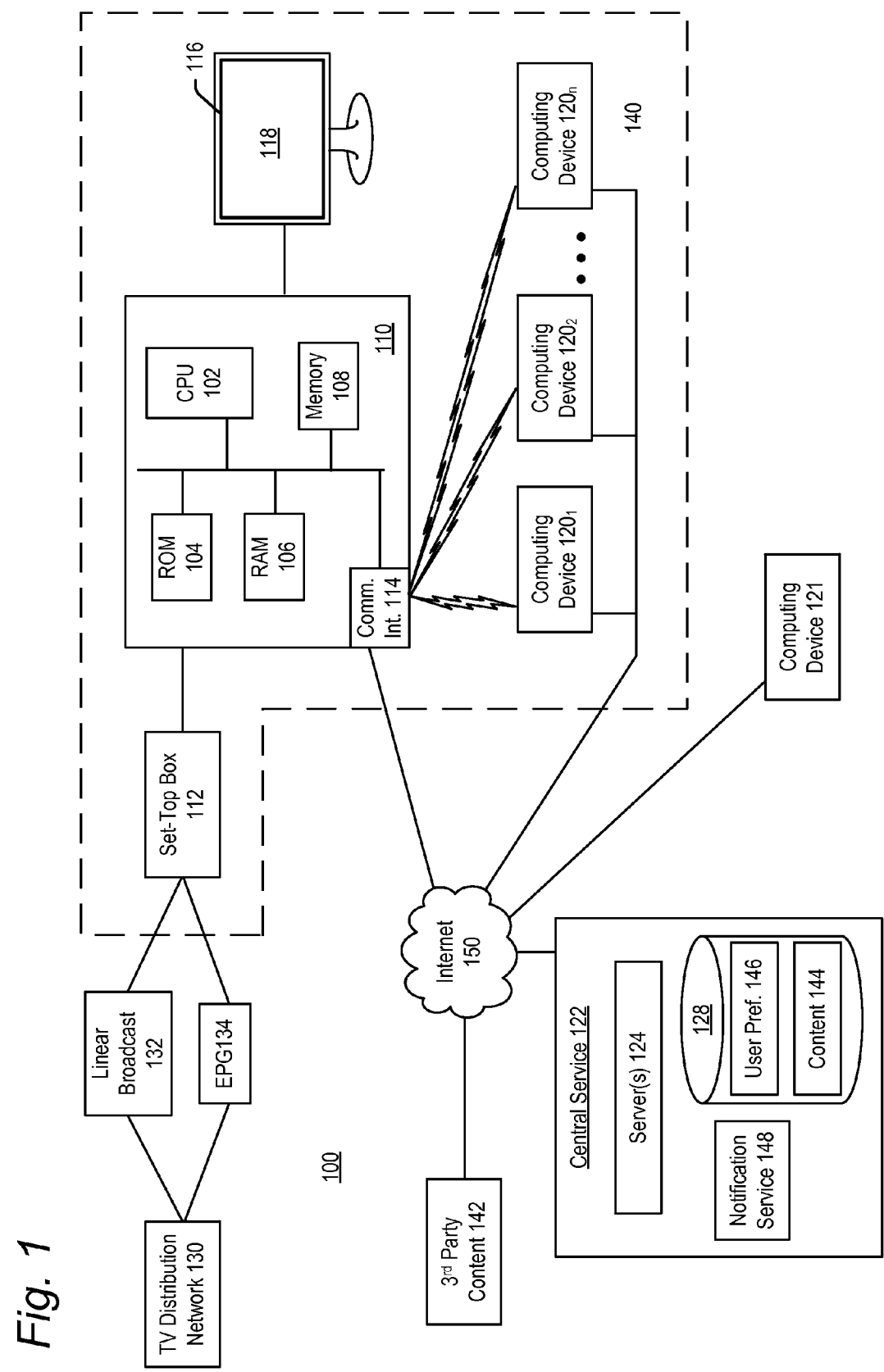
FIG. 1 is a network topology for implementing embodiments of the present technology.

Referring to FIG. 1, there is shown a schematic block diagram of a network topology 100 for implementing embodiments of the present technology. Network topology 100 includes infrastructure for presenting content to a group of users. The content may come from any of a variety of sources and may relate to a variety of different subject matter. In examples, the content may be a traditional linear television broadcast. Such linear broadcasts may be provided by a television distribution network 130, which may be for example a terrestrial television network (ABC, CBS, NBC, etc.), a cable TV provider, a satellite TV provider or other television distribution network.

The network 130 distributes a video feed including a linear broadcast 132 and an electronic program guide (EPG) 134. The linear broadcast feed may be any traditional broadcast television content. The EPG includes a breakdown of programming information by channel as to what linear broadcast content is presented and the times of such broadcasts. The EPG data may be customized by geographic location, and further typically includes metadata related to the linear broadcast, including for example a title of the linear broadcasts, the type of video broadcast (sports, entertainment, news, etc.), who is to appear in the linear broadcasts, and a numeric identifier for each linear broadcast.

The linear broadcast 132 and EPG 134 may be received within a set-top box 112 for presentation on a display 118 of a television or other A/V device 116. Display 118 is also referred to herein as the main display, as it may be viewed by the group as a whole. The set-top box 112 and A/V device 116 may be collocated within a location 140 such as for example a home, office, bar, etc. (indicated by the dashed line in FIG. 1). A computing device 110 (also referred to herein as primary computing device 110) may also be present at location 140, connected between the set-top box 112 and the A/V device 116. The linear broadcast 132 and EPG from the set-top box 112 may be transmitted through the computing device 110 to the A/V device 116. In embodiments, HDMI connections may be used between the set-top box 112 and the computing device 110 so that the linear broadcast 132 may be rendered as an HDMI pass-through video by the computing device 110 on the A/V device 116.

Details of an implementation of computing device 110 are provided below with respect to FIG. 9. However, in general, computing device 110 may be a desktop computer, media center PC, a gaming console and the like. As one example allowing HDMI pass-through, computing device 110 may be the Xbox One® video game console from Microsoft Corp., Redmond, Calif. Computing device 110 may alternatively be a portable computer such as a laptop, tablet or other device in further embodiments. Computing device 110 may include a processor such as CPU 102 having access to read only memory (ROM) 104 and random access memory (RAM) 106. Device 110 may further include a non-volatile memory 108 for storing data and application programs, such as an electronic notification application for implementing aspects of the present technology as explained below.

The computing device 110 may be connected to the A/V device 116, which may for example be a monitor, a high-definition television (HDTV), or the like that may provide a video feed, game or application visuals and/or audio. For example, the computing device 110 may include a video adapter such as a graphics card and/or an audio adapter such as a sound card that may provide audio/visual signals associated with recorded or downloaded linear broadcasts and web content. In one embodiment, the audio/visual device 116 may be connected to the computing device 110 via, for example, an S-Video cable, a coaxial cable, an HDMI cable, a DVI cable, a VGA cable, a component video cable, or the like. In further embodiments, the display 118 may not be a separate A/V device 116, but may instead be incorporated as part of computing device 110.

The networked topology 100 may further include a central service 122 for providing content to the primary computing device 110 and/or secondary computing devices 120 (explained below). The central service may further generate and send electronic notifications for display by the primary computing device 110 or one or more secondary computing devices 120. The central service 122 may include one or more servers 124 for aggregating content feeds from one or more third-party content providers 142. Aggregated content 144 may be stored in a central storage location 128 within or associated with the central service 122. In embodiments, one or more of the third-party content providers 142 may be owned, associated with or partnered with the central service 122. In further embodiments, the third-party content provider(s) 142 may be independent of the central service 122.

The central storage 128 of service 122 may further include a user records store 146. Such records include stored profiles and user preferences for one or more users. In the context of one embodiment of the present technology, user records may store sports preference information for a number of users, such as for example their favorite teams and players, their sports fantasy teams for fantasy sports leagues they participate in, sporting events they would like to watch and sports content they would like to receive, etc. This information may additionally or alternatively include a wide variety of other non-sports related information. A user may store this information with the central service 122 over time. It is further contemplated that the user records store 146 may be stored locally on computing device 110 instead of or in addition to the store 146 on the central service 122. The central service 122 may further include a notification service 148 for providing electronic notifications to users as explained below.

In embodiments, the central service 122 and third-party content provider(s) 142 may be network connected to the remote computing device 121 via a network connection such as the Internet 150 and a communications interface 114 within the computing device 110.

In an example mentioned above, the content displayed on the main display 118 to the group may be linear video content from a television distribution network 130. This content may be played back in real time (i.e., at the time it is transmitted from the television distribution network), or stored on primary computing device 110 or an associated DVR (not shown) for later playback. In further examples, the content displayed on the main display 118 may be IPTV web videos and/or other content from the central service 122 or directly from a third-party content provider 142.

In further embodiments, the content displayed on the main display 118 may be a video game executing on the primary computing device 110 and/or central service 122 (via a browser running on the primary computing device 110). The content being viewed on the main display 118 may further be still images, graphics and/or photographs, such as for example in a slide show. In still further embodiments, the content displayed on the main display 118 may be remote participants in a video web conference.

The topology 100 may further include a plurality secondary computing devices $120_1$, $120_2$, ..., $120_n$ (collectively or individually referred to herein as secondary computing devices 120) at the location 140. Each user in the group may have an associated secondary computing device 120 for receiving electronic notifications and, possibly, for interacting with or supplementing the content displayed on the main display 118. The secondary computing devices 120 may be portable computers such as laptops, tablets, smartphones or other hand-held digital assistants. One or more of the secondary computing devices 120 may be desktop computers in further embodiments. Details of an implementation of a secondary computing device 120 are described below with respect to FIG. 9. However, in general, secondary computing devices 120 may include a processor such as CPU 102 having access ROM 104, RAM 106 and a non-volatile memory 108 for storing data and application programs (as shown in the primary computing device 110).

In embodiments, the primary computing device 110 and secondary computing devices 120 may communicate with each other via a distributed computing environment. In such embodiments, devices 110 and 120 may be linked through a communications network implemented for example by communications interfaces 114 in the computing devices 110 and 120. One such distributed computing environment may be accomplished using the Smartglass™ software application from Microsoft Corporation which allows a first computing device to act as a display, controller and/or other peripheral to a second computing device.

It is also contemplated that one or more secondary computing device 120 may not have a direct network connection to the primary computing device 110. In that situation, the secondary computing device(s) may communicate with the primary computing device 110 via the Internet 150. In embodiments, users in the group and their secondary computing devices 120 are collocated with the primary computing device 110 at location 140 so that the users can view the main display 118. However, in an alternative embodiment, it is possible that one or more users in the group are remote from the location 140, such as the user associated with remote secondary computing device 121. As explained below, such a remote user would not be able to view the main display 118, but may still be able to receive electronic notifications intended for the group as a whole and for specific members including the user of the remote secondary computing device 121.

Figure 2:
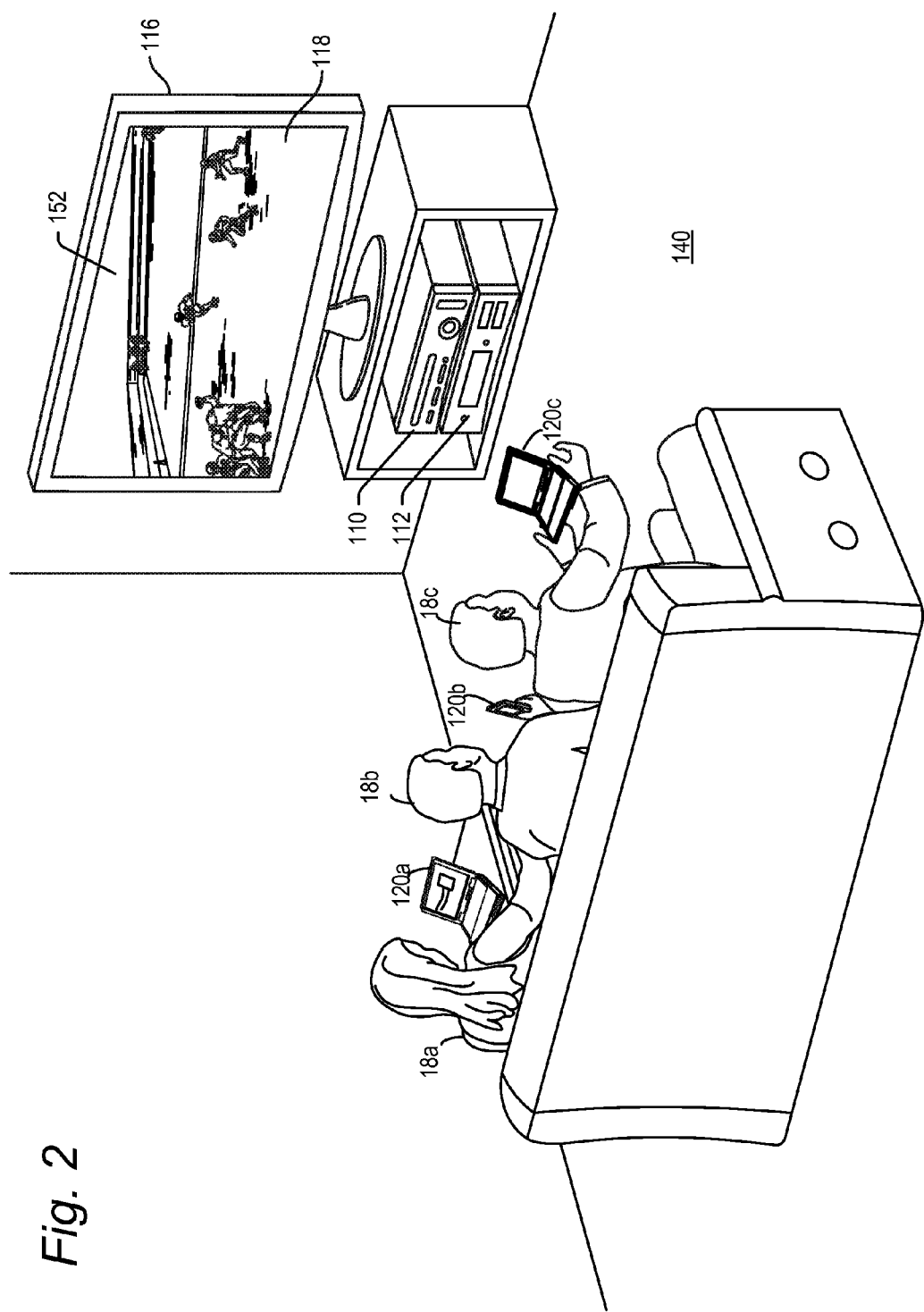
FIG. 2 is a system for implementing embodiments of the present technology.

FIG. 2 illustrates a location 140 with a group of users 18a, 18b, 18c (collectively, users 18) watching content 152 on the main display 118 of an A/V device 116. The example of FIG. 2 illustrates three users in the group, but it is understood that the group may consist of more or less than three users, such as for example up to sixteen or more users in further embodiments. The users 18 may each have a secondary computing device 120 as explained above. In addition to displaying electronic notifications, the secondary computing devices 120 may be used to interact with and/or control the primary computing device 110. In a further embodiment, the computing device 110 may implement a natural user interface (NUI) system allowing the users to interact with the computing device 110 through gestures and speech.

It is understood that the functions of computing devices 110 and/or 120 may be performed by numerous other general purpose or special purpose computing system environments or configurations. Examples of other well-known computing systems, environments, and/or configurations that may be suitable for use with the system include, but are not limited to, multiprocessor systems, microprocessor-based systems, set-top boxes, programmable consumer electronics, network PCs, minicomputers, distributed computing environments that include any of the above systems or devices, and the like.

Figure 3:
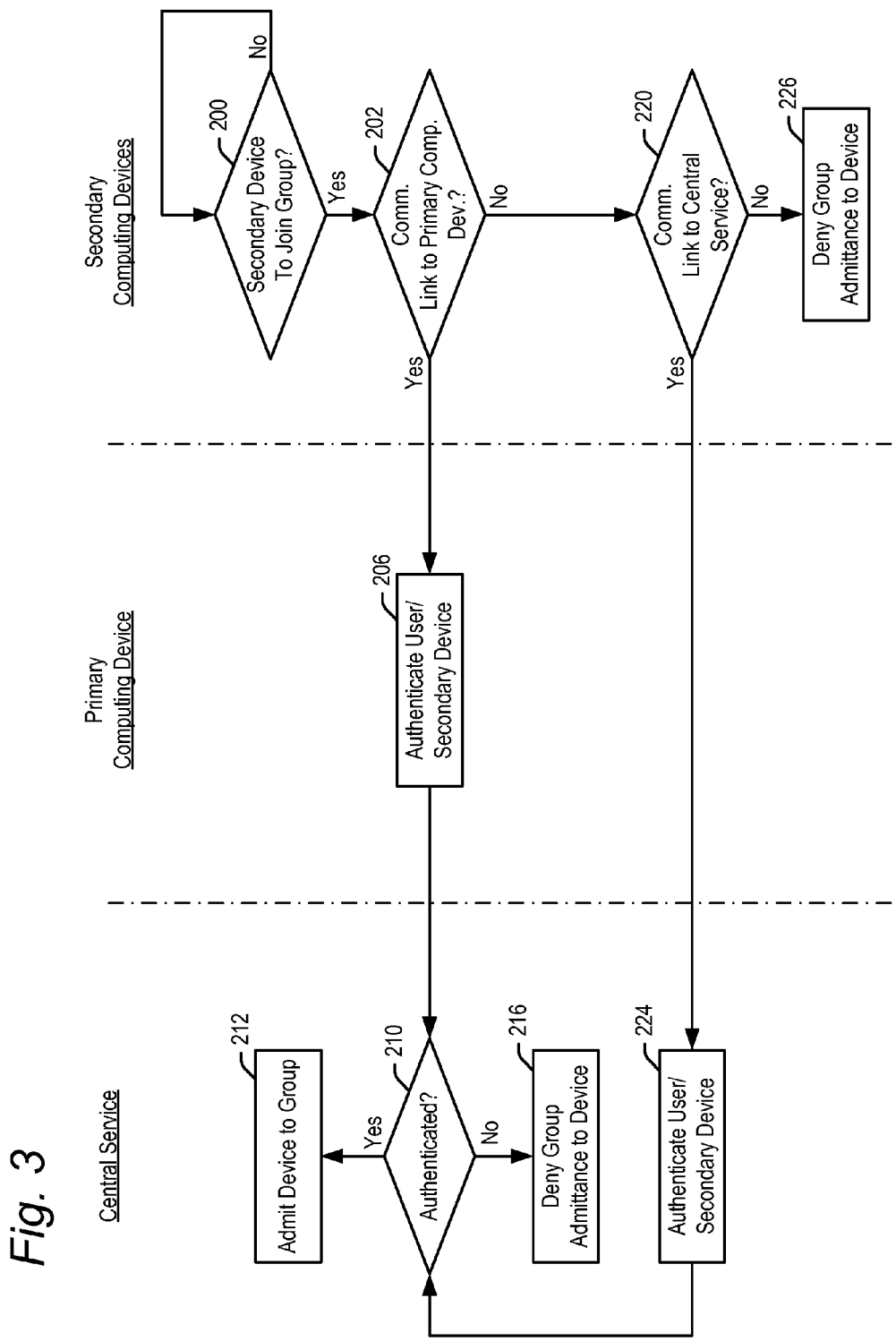
FIG. 3 is a flowchart for admitting members to a group according to embodiments of the present technology.

In order to participate in the group and targeted notifications according to the present technology, users may register as part of the group. A flow for such registration will now be explained with reference to the flowchart of FIG. 3. In step 200, a secondary computing device 120 attempts to join the group. This may occur automatically, as a result of the secondary computing device 120 arriving at location 140 or being within a given proximity of the primary computing device 110. In further embodiments, a user of a secondary computing device 120 may generate a manual request to join the group.

In step 202, the secondary computing device 120 may attempt a direct connection with the primary computing device 110 (such as for example by a Bluetooth® communications network or other local area network). If such a direct link is made, in step 206, the primary computing device 110 may attempt to authenticate secondary computing device 120. In particular, the primary computing device 110 may contact the central service 122 with an identification of the requesting secondary computing device, or associated user, to see if computing device is registered and/or if the user has existing user records in the record store 128. If the central service 122 is able to authenticate the user, the secondary computing device is admitted to the group in step 212. Otherwise, the secondary computing device is denied admittance to the group in step 216.

In step 202, it may happen that the hardware or software components of a secondary computing device do not enable a direct link to the primary computing device. In such a case, the secondary computing device may attempt a direct link to the central service in step 220 via the Internet 150. If the secondary computing device has such an Internet connection to the central service 122, the central service may attempt to authenticate the user and/or secondary computing device in step 224 as described above.

As noted, secondary computing devices seeking admittance to the group may typically be collocated with the primary computing device 110. However, it is contemplated that a remote secondary computing device 121 (FIG. 1) gain admittance to a group by making a manual request for admittance, and then contacting the central service 122 directly in steps 220 and 224. If a secondary computing device (collocated or remote) has no link to the primary computing device 110 (step 202) or to the central service 122 via the Internet 150 (step 220), then the secondary computing device may be denied admittance to the group in step 226.

The central service 122 and/or primary computing device 110 may keep track of the users and secondary computing devices within a group formed as described above. Groups may be dynamic in that users may be added to a group over time, or removed from a group over time (for example when a user leaves the location 140). Groups may also be temporary, and may completely disband after a period of time (for example when all users leave the location 140).

As indicated above, electronic notifications may be generated by the central service 122. These notifications may relate to information that is determined to be of interest to one or more users in a group. For example, a user may specify that he/she would like to receive notifications relating to specific topics, such as favorite sports teams and players, their sports fantasy teams for fantasy sports leagues they participate in, sporting events they would like to watch and sports content they would like to receive, etc. As indicated, notifications may relate to non-sports subject matter as well.

Figure 4:
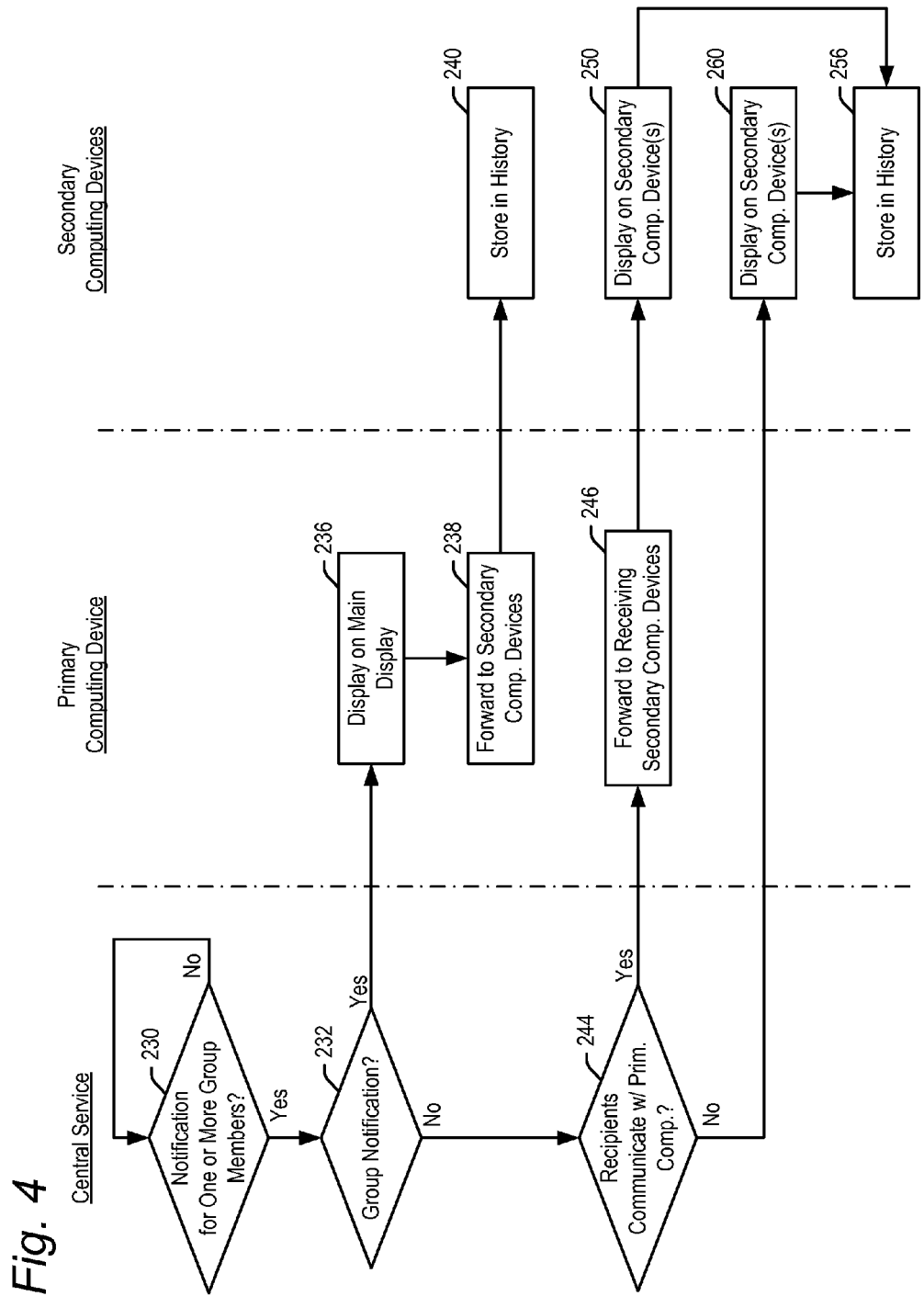
FIG. 4 is a flowchart for selectively sending electronic notifications to select members or the group as a whole according to embodiments of the present technology.

In accordance with the present technology, these electronic notifications may be displayed to the group as a whole on the main display 118 by the primary computing device 110, or targeted for display on one or more secondary computing devices 120. FIG. 4 is a flowchart illustrating these features of the present technology.

Figure 5:
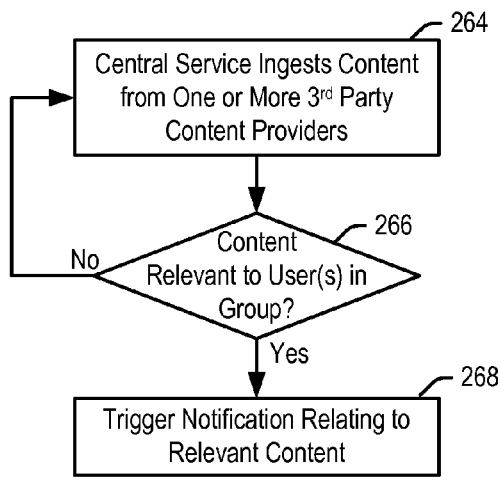
FIG. 5 is a flowchart illustrating further detail on the generation of an electronic notification according to embodiments of the present technology.

In step 230, the central service determines whether there are notifications for one or more group members. Further details of step 230 are now explained with reference to the flowchart of FIG. 5. In step 264, the central service receives and stores content on a wide variety of subjects from one or more third-party content providers 142. In step 266, a server 124 in the central service 122 may determine whether stored content is relevant to one or more users in a group. In particular, when the central service receives information from third-party content provider(s) 142, this information may be identified from summary metadata associated with the content, or the content itself. Once identified, user record store 126 may be analyzed and any users having a specified user preference for the received content may be identified.

In further embodiments, instead of or in addition to generating notifications based on user preferences, notifications may be generated based on some contextual condition. In an embodiment, where identified web content relates to two or more members of the group, an electronic notification may be generated for sending to at least those two members even where those members have not expressed an interest in the web content in their preferences. As an example, it may happen that two users in a group are playing each other in a fantasy football matchup, or their favorite teams are playing each other. It may further be that neither of these users has specified a user preference for material relating to their fantasy football team/favorite football team. However, the central service 122 may store information relating to the fantasy football league, and determine that these two players are playing each other. Thus, while neither user stored a preference to see fantasy/real team football notifications, the context that these two users are together at location 140 at the same time, and that they/their teams are playing each other, may be a condition used by the central service 122 to generate notifications to those two users regarding these events.

Another contextual condition may relate to the reason the group has assembled and/or the underlying content 152 being displayed on the main display 118. Even though the users in the group may not have stored preferences relating to the underlying content 152, the central service 122 may recognize the content being displayed and generate electronic notifications to the group contextually based on that content. The central service knows what web content is being displayed on the main display 118 by the primary computing device 110. Additionally, linear broadcast content from television distribution network 130 may be recognized by the central service 122 and/or primary computing device 110 based on data from the EPG 134. Notifications may be generated based on other contextual conditions in further embodiments.

If information is identified that is determined to likely be of interest to one or more users from a group, the notification service 148 generates an electronic notification to be sent to the group member(s) in step 268. The notification service selects the text of the electronic notification, for example based on the summary metadata. The notification service may alternatively or additionally include images and other graphics as part of an electronic notification.

Where two or more users are receiving the electronic notification, the text may be selected so as to be balanced as to receiving users. For example, where a notification is being sent to two users who are opponents in a game, informing one of a victory and the other of the loss, the notification may indicate the outcome but not celebrate the victory or lament at the loss. Conversely, if the group recipients are rooting for a win in a given game, the electronic notification can celebrate the win. Similarly, if recipients are rooting for a loss in a given game, the electronic notification can celebrate that loss.

Figure 6:
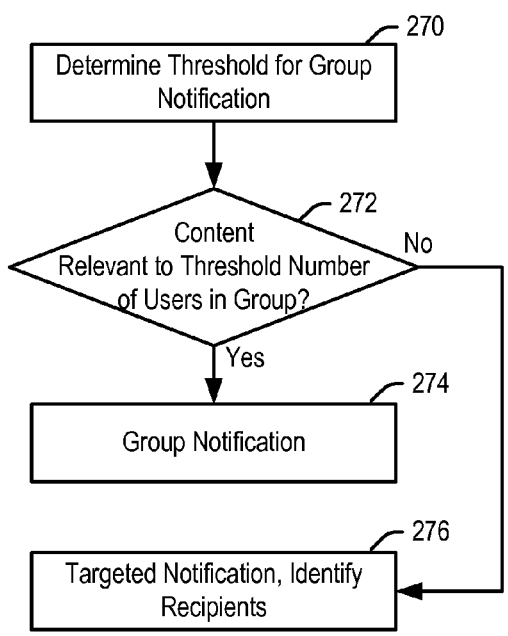
FIG. 6 is a flowchart illustrating further detail on determining whether or not an electronic notification is relevant to the group or to select members of the group.

Referring again to the flowchart of FIG. 4, once the notification service generates an electronic notification in step 230, the notification service may further determine whether it should be a group notification displayed to the whole group on the main display 118, or a targeted notification displayed to one or more specific secondary computing devices 120. Further details of step 232 are now described with reference to the flowchart of FIG. 6.

In step 270, a threshold number of users is determined for a group notification. That is, when the number of group users to whom the electronic notification is being sent meets or exceeds some threshold, the electronic notification is treated as a group notification and shown on the main display 118 to all group users. By contrast, when the number of group users to whom the electronic notification is being sent is below the threshold, the electronic notification is treated as a targeted notification and shown to specific users on their secondary computing devices 120.

The threshold number may vary depending on the number of users in the group. For example, for groups of four or more, the threshold may be 75%. For groups of three or less, the threshold may be 100%. It is understood that these group sizes and indicated percentages are by way of example only and may vary in further embodiments. The central service may store the number of users in a group at any given time, and the threshold may change as the number of users in the group changes.

In step 272, the notification service 148 may determine whether the number of group users to receive a particular notification meets the threshold for that group size. If yes, the notification is set as a group notification in step 274. If not, the notification is set as a targeted notification and the recipients are noted in step 276. In further embodiments, the step 272 of determining whether a notification is a group notification may be performed by the primary computing device 110.

Figure 7:
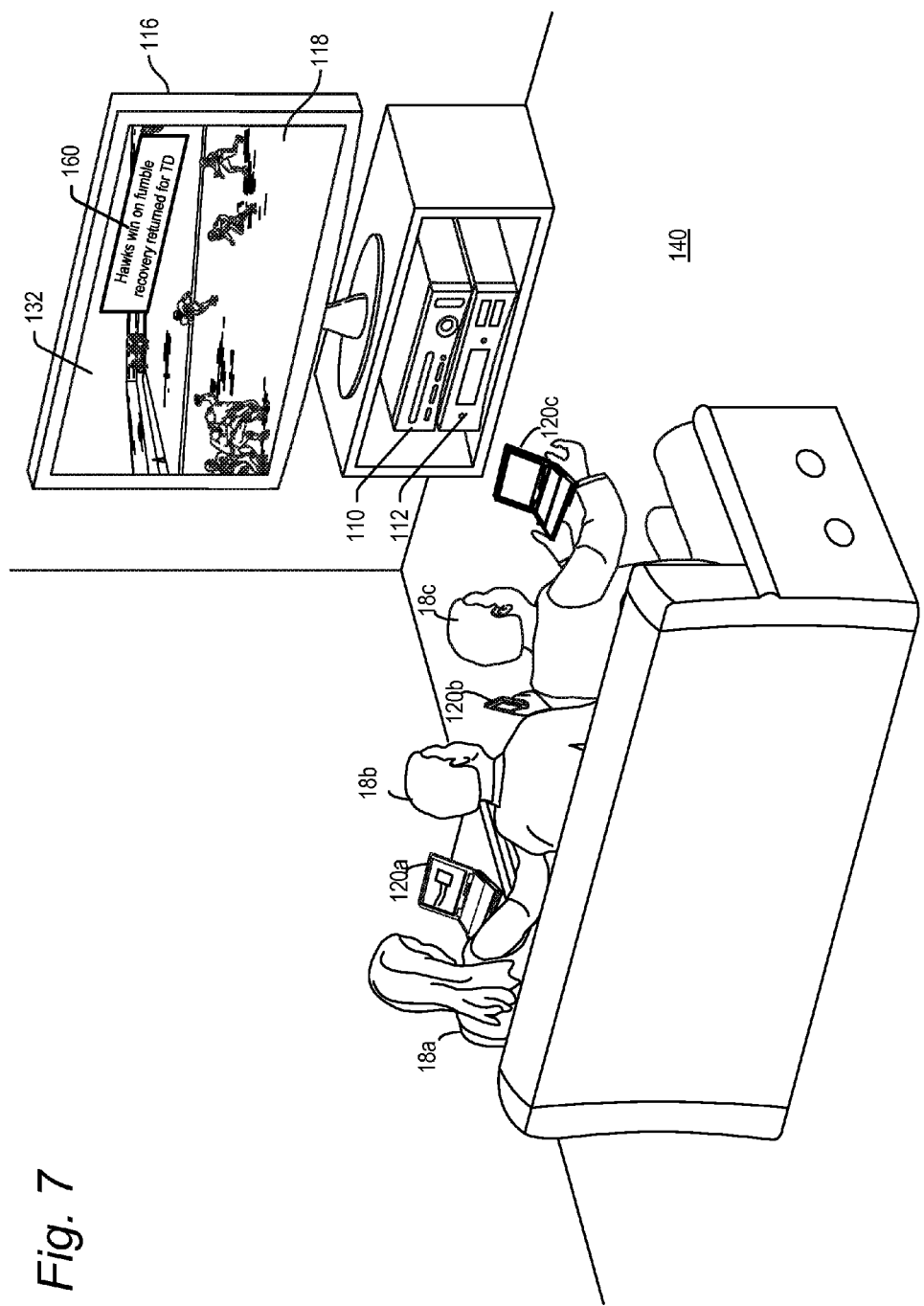
FIG. 7 illustrates the operation of an embodiment of the present technology to display an electronic notification on a main screen to the group as a whole.

Referring again to the flowchart of FIG. 4, if it is determined that the electronic notification is a group notification in step 232, the notification service 148 sends the electronic notification to the primary computing device 110. The primary computing device 110 then causes the electronic notification to be displayed to the group as a whole on the main display 118 of A/V device 116 in step 236. An example of a group notification 160 shown on the main display 118 is illustrated in FIG. 7.

Even though a group notification is displayed on the main display 118, each user in the group may want an individual record of the group notification on their secondary computing device 120. Therefore, in embodiments, a group notification may be forwarded to secondary computing devices 120 in the group in step 238. The respective secondary computing devices 120 may not display the notification, but they may store it in memory in step 240 so that they may view it at a later time when a user is reviewing a history of notifications received. The primary computing device 110 may forward group notifications to any secondary computing devices not having a direct connection to the primary computing device 110 via the Internet 150.

If step 232 determines an electronic notification is a targeted notification for specified users, the notification service 148 directs that notification to be sent to the secondary computing devices 120 of the specified users. Thus, these targeted users see the notification and other users in the group do not. In step 244, the central service may determine whether targeted recipients have a direct connection to the primary computing device 110. If so, the electronic notifications are sent to these secondary computing devices 120 through the primary computing device 110 in step 246. The targeted notification is displayed on the receiving secondary computing devices 120 in step 250.

Figure 8:
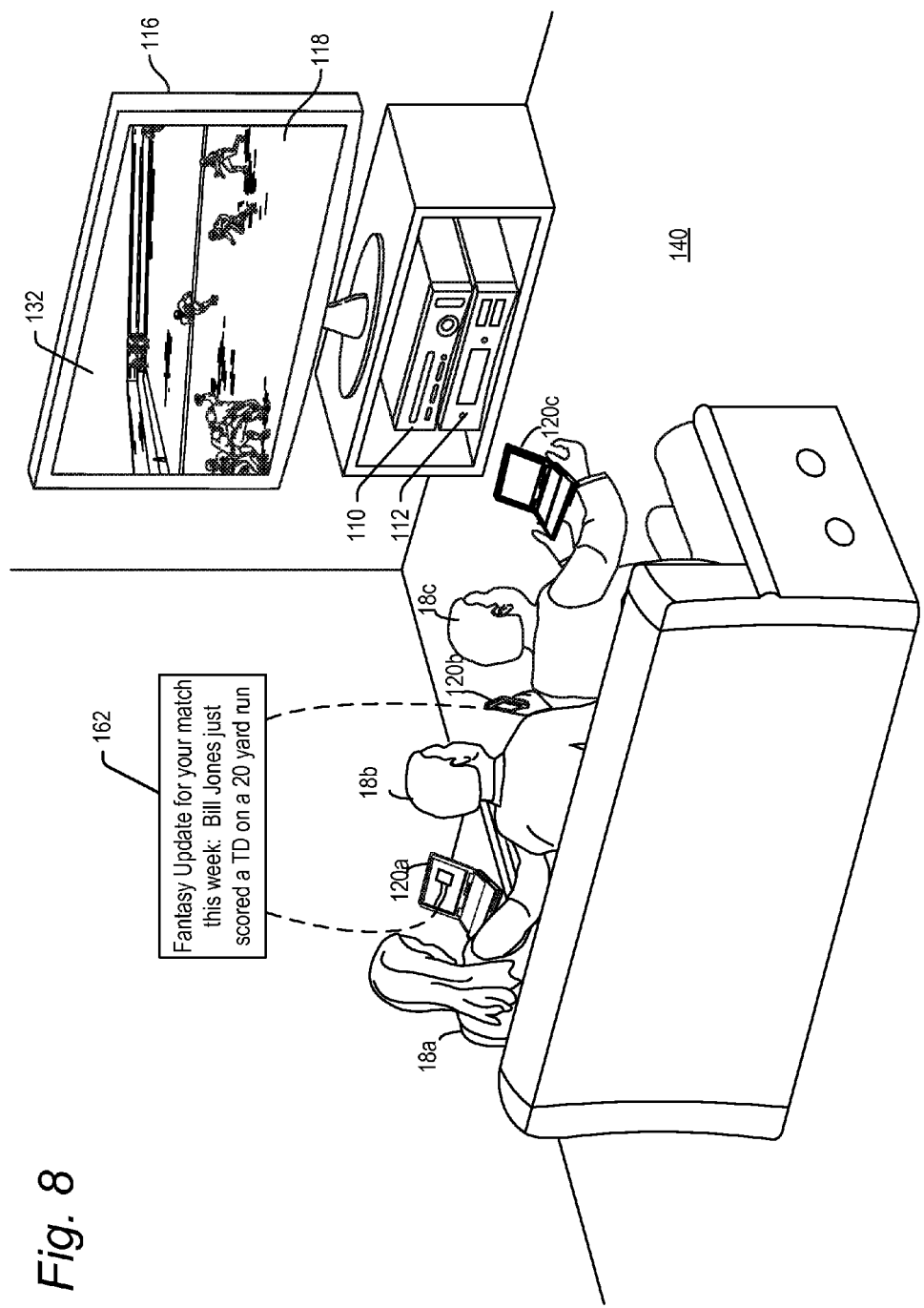
FIG. 8 illustrates the operation of an embodiment of the present technology to display an electronic notification to select members of the group via their secondary computing devices.

An example of a targeted notification 162 is illustrated in FIG. 8. In the example of FIG. 8, the notification service 148 may determine that a fantasy update is relevant to users 18a and 18b. In this example, the threshold for a group notification may be 100%. As less than 100% of the group are receiving this update, it is instead sent to both secondary computing devices 120a and 120b for display on those devices.

On the other hand, if it is determined in step 244 that one or more of the targeted recipients do not have a direct connection to the primary computing device 110, the targeted notifications 162 may be sent to these targeted secondary computing devices 120 via the Internet 150. In further embodiments, the primary computing device 110 may perform the step 244 of determining whether there are secondary computing devices 120 not having a direct connection to the primary computing device.

After targeted secondary computing devices receive and display a targeted notification in steps 250 or 260, these targeted secondary computing devices may store the notification in memory in step 256 so that it may be seen at a later time when a user is reviewing a history of notifications received.

As mentioned respect to FIG. 1, there may be one or more secondary computing devices 121 which are remote from the location 140. These remote secondary computing devices 121 may receive targeted notifications from the central service 122 as described above via the Internet 150. As remote secondary computing devices 121 cannot view the main display 118, the central service 122 may note any remote secondary computing devices 121 in a group. Upon sending a group notification 160, the notification may be shown on the main display 118 as described above, and may also be sent for display on remote secondary computing devices 121 in the group so that users of these devices can view group notifications as well. Thus, remote secondary computing devices 121 may receive and display both group and targeted notifications.

Figure 9:
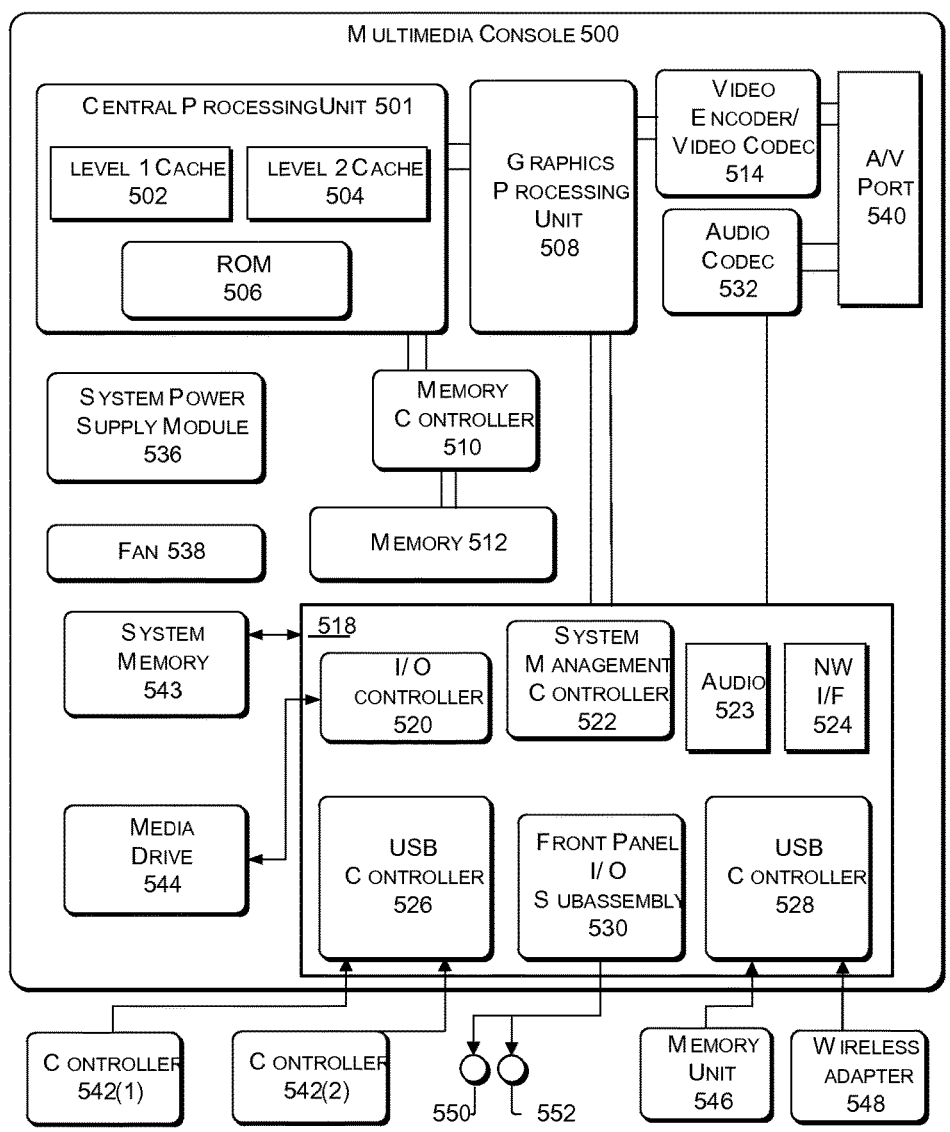
FIG. 9 is a block diagram depicting the components of an example entertainment console.

FIG. 9 illustrates an example embodiment of a computing system that may be used to implement primary and/or secondary computing devices 110, 120. As shown in FIG. 9, the multimedia console 500 has a central processing unit (CPU) 501 having a level 1 cache 502, a level 2 cache 504, and a flash ROM 506 that is non-volatile storage. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM.

The multimedia console 500 includes an I/O controller 520, a system management controller 522, an audio processing unit 523, a network (or communication) interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548 (another example of a communication interface), and an external memory device 546 (e.g., flash memory, external CD/DVD ROM drive, removable media, etc. any of which may be non-volatile storage). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. (any of which may be non-volatile storage). The media drive 544 may be internal or external to the multimedia console 500. Application data may be accessed via the media drive 544 for execution, playback, etc. by the multimedia console

500. The media drive 544 is connected to the I/O controller 520 via a bus, such as a Serial ATA bus or other high speed connection (e.g., IEEE 1394).

The multimedia console 500 may include a variety of computer readable media. Computer readable media can be any available tangible media that can be accessed by computer 441 and includes both volatile and nonvolatile media, removable and non-removable media. Computer readable media does not include transitory, transmitted or other modulated data signals that are not contained in a tangible media.

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 320 may define additional input devices for the console 500 via USB controller 526 or other interface. In other embodiments, computing system 312 can be implemented using other hardware architectures. No one hardware architecture is required.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for routing electronic notifications in a group environment having a main display viewed by the group and a plurality of secondary displays viewed by respective members of the group, comprising:
   (a) identifying two or more members of the group present at the same main display;
   (b) generating an electronic notification for at least one member of the group, based on the electronic notification being related to at least one of stored preferences for the at least one member of the group and contextual conditions relating to the at least one member of the group;

(c) determining whether the electronic notification relates to a predefined threshold number or percentage of members of the group; and (d) transmitting the electronic notification for display on one of the main display or the one or more of the secondary displays based on the determination in said step (c).

2. The method of claim 1, further comprising the step of displaying the electronic notification over content being displayed on the main display where the electronic notification is transmitted for display on the main display in said step (d).

3. The method of claim 2, wherein said step of displaying the electronic notification over content being displayed on the main display comprises the step of displaying the electronic notification over linear broadcast content or web content being displayed on the main display.

4. The method of claim 1, further comprising the step of forwarding the electronic notification to secondary computing devices associated with the respective secondary displays for storage on the secondary computing devices in the event the electronic notification is displayed on the main display.

5. The method of claim 1, further comprising the step of storing the electronic notification on one or more secondary computing devices associated with one or more of the secondary displays in the event the electronic notification is displayed on the one or more of the secondary displays.

6. The method of claim 1, wherein said step (b) of generating an electronic notification for at least one member of the group comprises the step of generating an electronic notification determined to relate to a contextual condition of the electronic notification being relevant to at least two members of the group.

7. The method of claim 1, wherein said step (b) of generating an electronic notification for at least one member of the group comprises the step of generating an electronic notification determined to relate to at least one of the contextual conditions of a reason the group has assembled, and content that is being watched by the group on the main display.

8. The method of claim 1, wherein at least one of the steps (a) through (d) is performed by a server at a central service remote from the main and secondary displays.

9. The method of claim 1, wherein the step (c) is performed by a computing device associated with the main display.

10. A system for routing electronic notifications to a co-located group, comprising:

a main display for viewing by the group;

a primary computing device associated with the main display, the primary computing device identifying members of the group watching the main display and the primary computing device receiving content for presentation on the main display; and a plurality of secondary computing devices including secondary displays;

wherein the primary computing device receives an electronic notification and determines whether the electronic notification is relevant to at least a predefined number or percentage of members in the group, the primary computing device causing: i) the electronic notification to display on the main display over the content, or ii) the primary computing device transmitting the electronic notification to one or more of the secondary computing device for display on one or more of the secondary displays, based on whether or not the electronic notification is determined to be relevant to at least a predefined number or percentage of members in the group.

11. The system of claim 10, further comprising a central service, network connected to the computing device, the primary computing device receiving the electronic notification from the central service.

12. The system of claim 11, further comprising a third-party content provider for providing web content to the central service.

13. The system of claim 12, wherein the central service generates the electronic notification based on the central service determining that the web content received from the third-party content provider relates to a stored user preference for a member of the group.

14. The system of claim 12, wherein the central service generates the electronic notification based on the central service determining that the web content received from the third-party content provider contextually relates to two or more members of the group.

15. The system of claim 10, wherein the primary computing device is one of a gaming console and media player, and the plurality of secondary computing devices comprise at least one of a laptop, tablet and smart phone.

16. The system of claim 10, wherein the primary computing device, plurality of secondary computing device and main display are collocated in the same location.

17. A computer-readable media for programming a processor to perform a method of routing electronic notifications in a group environment having a main display viewed by the group and a plurality of secondary displays viewed by respective members of the group, comprising:

(a) identifying content that is determined to be of interest to one or members in the group;

(b) generating an electronic notification for at least one member of the group upon said step (a) of identifying content that is determined to be of interest to the one or members in the group;

(c) determining whether the electronic notification relates to a predefined threshold number or percentage of members of the group;

(d) transmitting the electronic notification for display on the main display where it is determined in said step (c) that the electronic notification relates to at least the predefined threshold number or percentage of members of the group; and (e) transmitting the electronic notification for display on one or more of the secondary displays where it is determined in said step (c) that the electronic notification relates to less than the predefined threshold number or percentage of members of the group, the one or more of the secondary displays receiving the transmission in said step (e) being the one or more secondary displays of members for whom the electronic notification was deemed related.

18. The computer-readable media of claim 17, wherein the electronic notification is generated for a member where the member has a stored preference for receiving information contained in the electronic notification.

19. The computer-readable media of claim 17, wherein the electronic notification is generated for at least two members where the members share a contextual condition described in the electronic notification.

20. The computer-readable media of claim 17, further comprising the step of admitting members to the group upon authenticating the members via a computing device associated with the display or a central service remote from and network connected to the computing device.

* * * * *